United States Patent [19]

Carey, II et al.

[11] Patent Number: 5,259,166
[45] Date of Patent: Nov. 9, 1993

[54] ROOFING SYSTEM FOR POTABLE WATER

[75] Inventors: Jay F. Carey, II, Follansbee, W. Va.; Mehrooz Zamanzadeh, Pittsburgh, Pa.

[73] Assignee: The Louis Berkman Company, Steubenville, Ohio

[21] Appl. No.: 751,337

[22] Filed: Aug. 29, 1991

[51] Int. Cl.⁵ .................. E04D 1/34; E04B 1/06
[52] U.S. Cl. .................. 52/748; 52/520; 52/528; 52/551; 29/507; 29/514
[58] Field of Search .......... 52/520, 545, 551, 478, 52/588, 748, 528; 29/507, 514

[56] References Cited

U.S. PATENT DOCUMENTS

| | | | |
|---|---|---|---|
| 511,384 | 12/1893 | White | 52/520 |
| 1,597,283 | 8/1926 | Murray | 52/16 |
| 4,009,548 | 3/1977 | Hicks | 52/469 |
| 4,160,014 | 7/1979 | Gamo et al. | 423/644 |
| 4,934,120 | 6/1990 | Boyd | 52/518 |
| 4,982,543 | 1/1991 | Boyd | 52/521 |
| 4,987,716 | 1/1991 | Boyd | 52/520 |
| 5,001,881 | 3/1991 | Boyd | 52/545 |
| 5,022,203 | 6/1991 | Boyd | 52/199 |

*Primary Examiner*—James L. Ridgill, Jr.
*Attorney, Agent, or Firm*—Body, Vickers & Daniels

[57] ABSTRACT

A method and system for applying a water gathering and channeling roof covering onto the upper roof of a building, which roof is at least slightly pitched, wherein fully annealed sheets of at least 99% titanium with a thickness of less than 0.020 inches are preformed into roof pans with right hand and left hand edges thereof formed into matching, longitudinally extending standing seam elements. The pans are placed in adjacent, abutting relationship with one another and joined together by press fitting adjacent standing seam elements into a standing seam extending along the roof's pitch and forming a water collecting trough for gathering potable rain water.

20 Claims, 6 Drawing Sheets

FIG. I

ROOFING SYSTEM FOR POTABLE WATER

The present invention relates to the art of converting a pitched roof into a potable water gathering system and more particularly to a method of applying a water gathering and channeling roof covering onto the upper roof of a building, which covering is formed from a metal that is inert and neutral to rain water.

INCORPORATION BY REFERENCE

The present invention relates to a system of roofing employing elongated preformed strips of metal having opposite edges formed into matching standing seam elements so that the strips can be placed in side-by-side relationship and the standing seam elements can be folded or formed into an upstanding seam between the strips so that water can pass downwardly between the standing seams as it is gathered by the roof. This system has been popularized and is generally associated with Follansbee Steel, a division of The Louis Berkman Company located in Steubenville, Ohio and is shown in several patents such as Boyd U.S. Pat. Nos. 4,934,120; 4,982,543; 4,987,716; 5,001,881 and 5,022,203. These patents are incorporated by reference herein to show the standing seam type roofing system to which the present invention is directed.

BACKGROUND

In many areas of the world, particularly tropical areas, the potable water supply system utilizes roof structures for gathering rain water which is directed to a collecting reservoir. Use of such systems are increasing worldwide. In certain areas of the world, population increases coupled with primitive or inadequate sewage treatment facilities have toxified the aquifer rendering well water unfit for consumption. In other areas, toxic wastes have poisoned the acquifer and/or underground wells again rendering well water unfit for consumption. In such areas, roof structures, particularly roof structures for large buildings, form an integral part of the potable water system.

Slate, shale, tile and bituminous roofing systems are unsuitable for collecting and directing potable water from the roofs of various buildings to collecting reservoirs. Besides water contamination, such systems are unsuitable as roofing structures for certain climates. Metal roofing systems are the only roofing systems suitable for use in all climates throughout the world.

The most common, long term, durable and easily assembled roof system which can be used for channeling water along a pitch roof of a large building is the Follansbee roofing system which is commonly known as the FRS system. One of the essential features of the FRS system, as currently produced, is the use of terne coated steel as the roofing material. The terne coated steel employed in the FRS system is a type 304 stainless steel coated on both sides with a terne alloy of 20% tin, 80% lead. The terne coated steel has inherent characteristics which assure functional longevity of the roof. Among such characteristics is the fact that the FRS terne coated steel solders easily so that pretinning or other special preparations are not required. This characteristic assures leakproof seams and joints. Importantly, the FRS terne coated steel is one of the most easily worked metals permitting on-site formation of standing seams without difficulty. The terne coated sheeting which is usually supplied in 26 to 28 gauge thickness (0.015 to 0.018 inches) is strong, takes shape and holds it but is easily worked. This is an important characteristic of the FRS system permitting not only easy installations but precise placement and forming of waterproof seams. Also, the FRS terne coated steel is not effected by alkali attack permitting applications in which contact with cement is possible and the terne coating is anodic to stainless steel which means that the terne coating will sacrifice itself to protect the core metal.

The aforementioned characteristics of the terne coated steel allows for a unique construction of either preformed or job site formed roofing pans, cleats, caps and other components which collectively form and have become widely known in the trade as the FRS system. Reference should be had to Boyd U.S. Pat. Nos. 4,934,120; 4,982,543; 4,987,716; 5,001,881 and 5,022,203 for a detailed discussion of the FRS system and many of the components used therein.

Despite all the advantages and inherent functional characteristics of the terne coat steel which permitted and enabled the development of the FRS system, terne coated steel is unsuitable for use in a potable water collecting system. This deficiency is not limited to terne coated steel but is applicable to all other metals currently used in conventional metal roof systems. For example, roofing systems formed from only stainless steel form standing seams by resistance welding, and the welding causes corrosion which can contaminate rain water and significantly reduce the life span of the roof.

SUMMARY OF THE INVENTION

It is a principal object of the present invention to provide a water collecting system which uses a roof system of an inert or neutral material which is unreactive to water and which is suitable for collecting potable water drained between standing seams in the roof.

This object, along with other features of the invention, is achieved by means of a conventional type water gathering system employing a roofing system, method or apparatus (or alternatively a roofing system, method or apparatus adapted for use in a water gathering system), which roofing system uses fully annealed sheets of titanium having at least 99% titanium and a thickness of less than 0.020 inches, generally within 0.010–0.015 inches and specifically between 0.012–0.014 inches. Preferably the sheets are preformed into roof pans by forming the first edge of the strip into a first standing seam element with a first integral wall extending orthogonally from the strip and coterminous with the first edge so that the first standing seam element terminates in an outwardly extending flange and the second edge of the strip is formed into a second standing seam element, with the second integral wall extending orthogonally from the strip and coterminous with the second edge so that the second standing seam element terminates in an inwardly extending flange. Preferably the roof pans are formed of titanium sheets cut into lengths which do not exceed about ten feet, with a width extending between sheet edges of no more than about three feet. The roof substrate of the building is covered by placing two of the formed titanium strips or pans in side-by-side relationship, with each of the strips forming water draining troughs in the direction of the pitch of the roof. The first standing seam element of the first of the two pans abuts the second standing seam element of the second pan with abutting seam elements folded into an outwardly protruding standing seam between the two pans so that the integral walls of the abutting seam elements remain somewhat orthogonal to the flat base sections of the first and second titanium pans. More specifically, the abutting standing seam elements are simply press fitted into a standing seam and preferably the orthogonal walls of the abutting seam elements are press fitted together at a position below the press fitted standing seam whereby a titanium, waterproof standing seam is formed in the welding, soldering or otherwise permanently affixing the seam elements to one another, thus avoiding metal corrosion to assure potable water while forming waterproof seams capable of thermal expansion and contraction in a system having exceptional long life characteristics. Alternatively, a compressible sealant, or still further alternatively, a compressible sealant-adhesive can be applied to one or more of the standing seam elements prior to forming the standing seam.

In accordance with another aspect of the invention, an elongated, attachment cleat formed from a fully annealed titanium sheet of at least 99% titanium and having a lower generally flat plate member and an orthogonal wall member is provided, and the flat plate member of the attachment cleat is fastened to the substrate with the cleat wall member extending upwardly between abutting standing seam elements, whereby the cleat is folded with the abutting standing seam elements into the standing seam which is entirely titanium to avoid any galvanic action or other chemical reactions between roofing components.

In accordance with a specific feature of the invention, titanium strips or pans are formed with a trailing end and a leading end so that the edge of the trailing end between standing seam elements is folded back on top of the strip and the edge of the leading end between standing seam elements is folded back under the strip. Longitudinally adjacent roof pans are abutted so that the leading end of the highest strip or pan overlies the trailing end of the adjacent strip or pan. A titanium fastening cleat having a C-shaped open end is secured to the roof substrate and the trailing end of the lower pan in turn is inserted into the C-shaped opening of the fastening cleat and secured thereto. A titanium clip having an offset edge is affixed by adhesive a predetermined distance from the trailing end of the lower pan and intermediate the roof pan sealing elements. The leading edge of the higher pan is inserted into the offset portion of the offset clip as the trailing edge of the lower pan is inserted into the fastening cleat and the standing seam is continuously formed between adjacent pans whereby a water tight cross seam secured to the roof substrate is formed between adjacent pans which permits thermal expansion and contraction of the pans.

In accordance with yet another specific feature of the invention, a first plurality of the formed titanium pans are placed side-by-side with standing seams formed therebetween to cover a first portion of the roof substrate and a second plurality of the formed titanium strips are placed side-by-side with standing seams formed therebetween to cover a second portion of the roof substrate and the first and second portions are situated relative to one another so that the trailing axial ends of the first plurality of titanium pans are adjacent but spaced from the trailing axial ends of the second plurality of titanium pans. A titanium batten clip of somewhat S-shaped configuration is provided. The batten clip has a web section generally orthogonal to the pan's standing seam elements which transversely extends between standing seam elements and is adjacent to the trailing axial ends of the pans in the first and second pluralities which in turn are adjacent one another. The batten clip includes an attachment leg extending from the web section above the standing seam elements and away from the pan's axial end, and a base section extending from the pan's trailing web section toward the pan's trailing axial end. The base section is affixed by adhesive to the central or base portion of the roof pan at a predetermined distance from the pan's trailing axial end. A titanium ridge cap of generally V-shaped configuration having ends forming an acute angle with each leg of the V is provided and the ridge cap ends are bent under the attachment leg of the batten clip to affix the ridge cap to the strips by means of the batten clips so that the axial ends of the titanium roof pan of the roof apex are covered in a waterproof manner.

It is thus another object of the present invention to provide a metal roofing system using titanium sheets.

It is another object of the present invention to provide a metal roofing system which is chemically, electrically and mechanically inert or neutral, insofar as the roof system has any effect on or reaction with rain water.

It is still yet another object of the invention to provide a potable water gathering system employing a metal roofing system constructed of titanium having any one or more of the following features:

(a) Titanium sheet characteristics are specified so that the titanium sheet has sufficient rigidity and toughness to function in a manner equivalent to that of a terne coated stainless sheet roofing member while possessing sufficient formability characteristics to permit formation of a standing seam and retention thereof;

(b) On-site formation of a standing seam without welding and optionally without use of sealants and even adhesives while retaining water tight characteristics notwithstanding thermal expansion and contraction of the material; and/or (c) Minimal use of adhesive, specifically minimal use of adhesive only for clip attachment.

It is yet another object of the invention to provide a roof system in which the color of the metal can be predetermined, within limits, and maintained throughout the metal cross-section and the life of the roof system.

It is another object of the invention to provide a metal roofing system which does not require any plating, coating or paint which otherwise could chip or flake during the life of the roof.

Still yet another object of the invention is to provide a titanium sheet metal roof system which is easy to install and/or inexpensive when compared to that of existing other roof systems and/or long lasting and/or easily repaired and/or relatively maintenance free.

It is still yet another object of the invention to provide a roof system ideally suited for large buildings with low pitch roofs employing standing seam joints formed on site for collecting potable rain water carried from the building by the roof system.

These and other objects of the present invention will become apparent to those skilled in the art upon a reading of the detailed description of the invention set forth below taken together with the drawings which will be described in the next section.

BRIEF DESCRIPTION OF THE DRAWINGS

The invention may take physical form in certain parts and arrangement of parts, preferred and alternative embodiments of which will be described in detail and illustrated in the accompanying drawings which form a part hereof and wherein:

FIG. 1 is a pictorial view of a building provided with a metal roof assembly of the present invention;

DESCRIPTION OF THE PREFERRED EMBODIMENTS

Figure 1A:
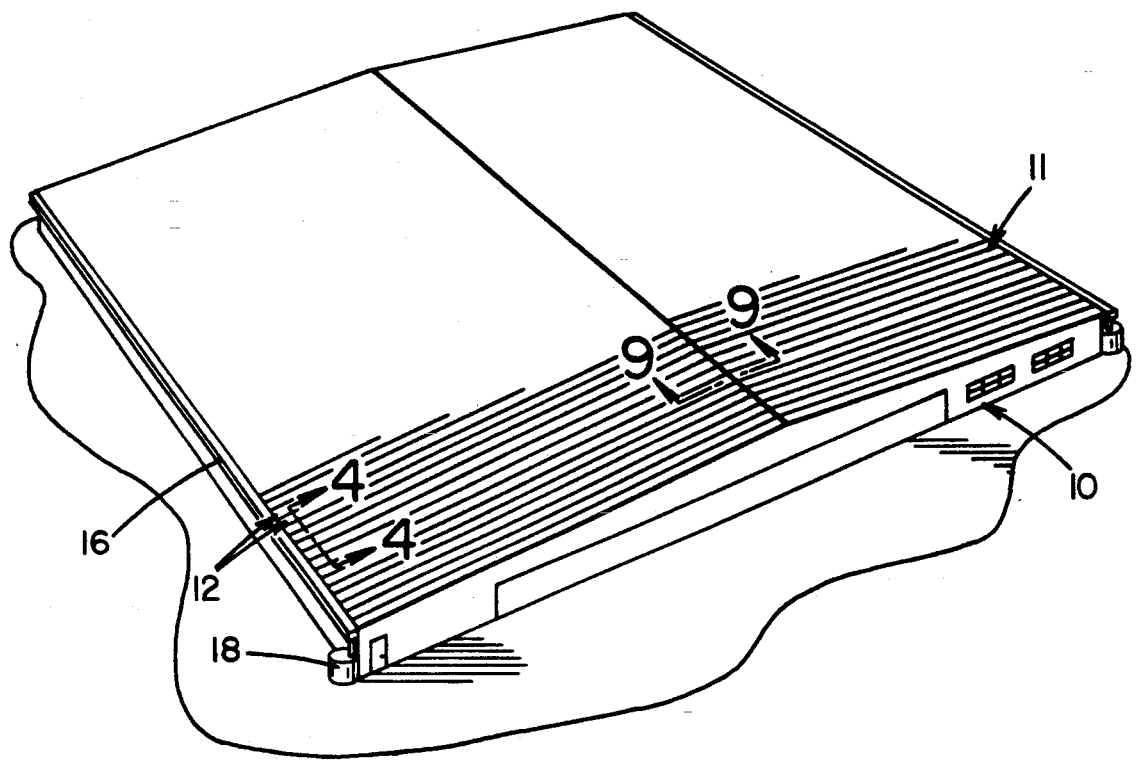
FIG. 1A is an end view of the building shown in FIG. 1 illustrating in schematic form a water collecting reservoir therefor.
Figure 1A:
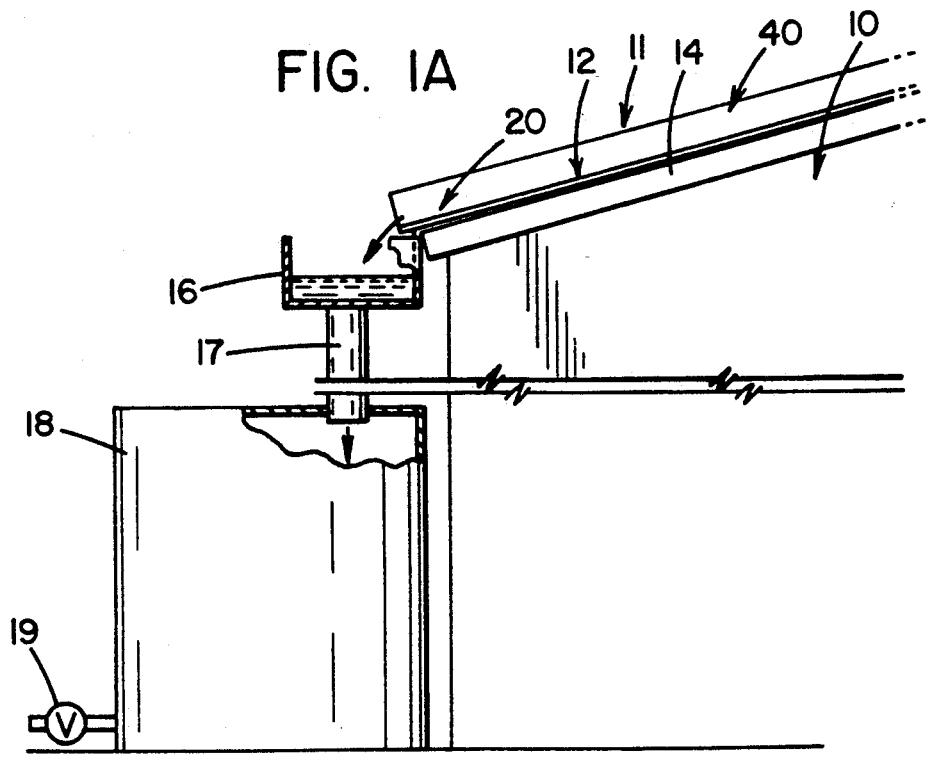

Referring now to the drawings wherein the showings are for the purpose of illustrating preferred and alternative embodiments of the invention only, and not for the purpose of limiting the same, there is shown in FIG. 1 a building 10 having a low pitch roof 11 covered by strips of titanium sheets formed into roof panels or pans 12 secured to a roof substrate 14 (best shown in FIGS. 3-9). Pans 12 are elongated or longitudinally extend in the direction of the pitch of roof 11 and because of the cross seam construction, as will be described with reference to FIG. 8, the preferred embodiment of the invention is limited to roofs of low pitch which, for purposes of this invention, is defined as being six inches or less to the foot.

Referring now to FIG. 1A, there is illustrated schematically the water collecting system of the present invention. In accordance with the invention adjacent roof pans 12 are joined together to form a standing seam so that the pan section between adjacent standing seams forms a trough 20 in which water flows from high to low portions of the roof along the roof pitch. The water drains into a gutter 16 and from there to a downspout 17 where it collects in an appropriate reservoir 18 and a valved opening 19 is provided for draining reservoir 18. Gutter 16, downspout 17 and reservoir 18 are preferably formed of an inert, nonreactive material such as titanium so that contamination of the potable rain water does not occur.

One of the essential features of the present invention is that the roofing material used in the water collecting roof system described herein be an inert, nonreactive (chemically or otherwise) material which will not contaminate the rain water collected by the system or otherwise render the water unfit for human consumption, but at the same time possess mechanical, chemical and physical properties which are functionally suitable from durability, aesthetics and application considerations for roofing material used in a roofing system. It has been determined after investigation and experimentation that titanium in sheet form having the composition and characteristics set forth below will adequately function in a roofing system and will have attributes similar to the FRS system provided that provisions are made to the roofing system as set forth herein. The titanium sheet, i.e. the preferred embodiment disclosed herein, is specified as follows:

Compositional limits (ASTM B265 Grade 2): - 0.03% max N: 0.10% max C: 0.015% max H: 0.18% max 0.020% max Fe: 0.05% others (each): 0.3% max others (total).

Metallurgical: Composed of alpha phase characterized by a hexagonal close-packed structure which is stable from room temperature to approximately 1620° F. Alpha alloy cannot be heat treated to develop higher mechanical properties since it is a single-phase alloy. The material has an equiaxed grain structure and so is in the annealed condition, and can be cold or hot rolled.

| MECHANICAL (as measured): | |
|---|---|
| Yield strength | 47900 Lb/square inch |
| Tensile strength | 57000 Lb/square inch |
| Elongation | 22.55% in 2 inches |
| Hardness | 81.2 Rockwell B Scale |
| Thickness | 0.014 inches |
| PHYSICAL: | |
| Density | 0.163 Lbs/cu in |
| Melting point | 3020 F. |
| Beta Transus | 1675 F. |
| Specific Heat | 0.124 Btu/Lb/F |
| Thermal conductivity | 9.5 Btu/hr./Sq.Ft/F/Ft |
| Coeff. of expansion | 0.000009/C |
| Electrical resistivity | 56 Microhm.cm |
| Poisson's Ratio | 0.34 |
| THICKNESS: | Less than 0.020 inches 0.010–0.015 inches, generally 0.012–0.014 inches, specifically |

Flat titanium sheet meeting the specifications defined above is commercially available. Depending on the annealing treatment, it is possible to obtain the titanium in different colors. One source of such titanium sheet is Sumitomo Metal Industries, Ltd.

Titanium sheet furnished to this specification has excellent strength and durability characteristics which make it suitable for use in the metal roofing system. At the same time even though the material possesses a high yield strength, it can be formed at the job site into the system as described hereafter. The assembly is characterized by the absence of any welding of the titanium strip. It is known that titanium has a strong affinity for oxygen, nitrogen and hydrogen gases. When welded under high temperature conditions titanium will absorb oxygen and nitrogen gases and become hard and brittle. Conventional practice require that welding of titanium be done in an environment where the strip can be shielded by inert gases to prevent oxidation of titanium which will adversely affect the life expectancy of the roof and contribute to premature failures as the roof system expands and contracts. In addition, it is also to be noted that the titanium strip of the present invention whether supplied as hot rolled or cold rolled is furnished in a fully annealed condition so that it can be formed into the shapes hereafter defined.

Figure 2:
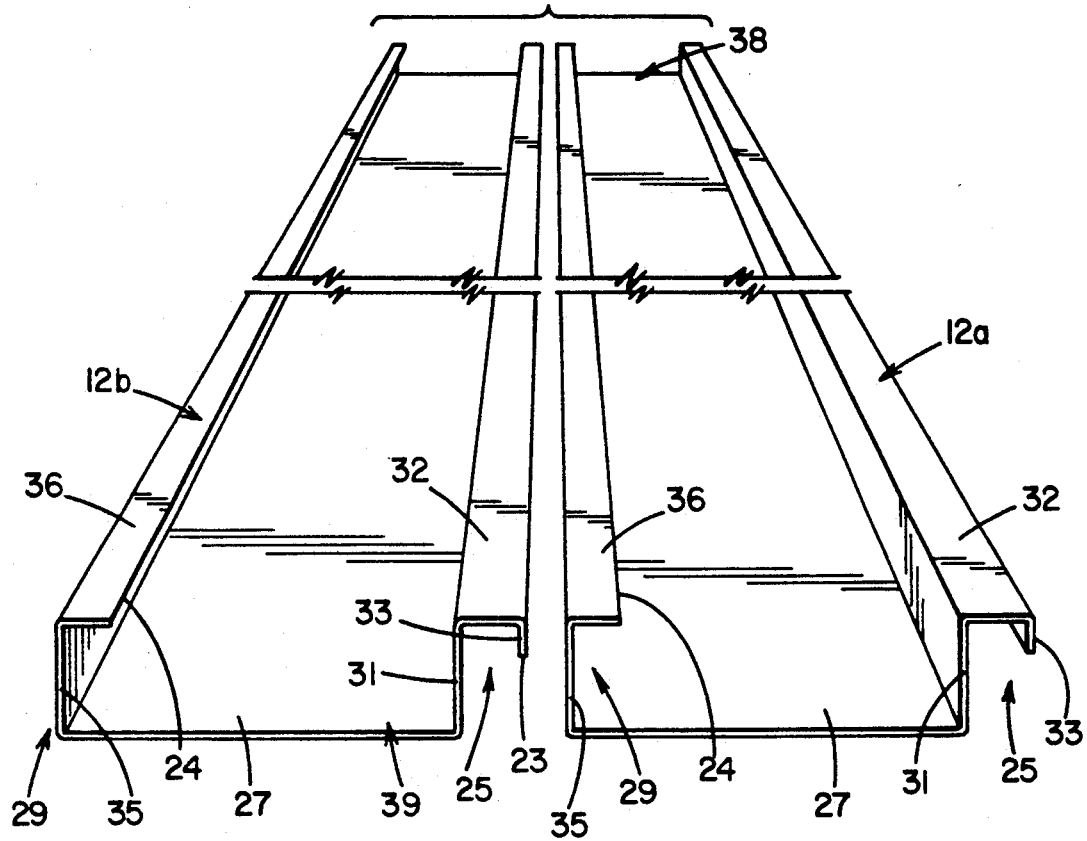
FIG. 2 is a perspective view of a pair of adjacent roofing pans formed from titanium strip used to cover the roof substrate of the building shown in FIG. 1.

Titanium strips in widths not exceeding about thirty inches are preferably cut into lengths not exceeding about ten feet and preformed into roof pans 12 having a shape shown in FIG. 2. More specifically, the strip has a width extending between longitudinally extending first and second edges 23, 24. The strip is formed adjacent its first edge 23 into a first standing seam element or right hand end 25 which extends orthogonally from the flat strip pan base section 27 and terminates in outwardly extending flange while the strip adjacent the second strip edge 24 is formed into a second standing seam element or left hand end 29 which extends orthogonally to pan base section 27 and terminates in an inwardly extending flange. More specifically, right hand end 25 formed as an outwardly extending flange has an upstanding leg portion 31 terminating in a bight wall portion 32 generally parallel to pan base 27 which in turn terminates in a downwardly extending end wall portion 33 to define a flange which may be viewed as channel-shaped in cross-sectional configuration. Left hand edge 29 of roof pan 12, formed as an inwardly extending flange, is defined by an upwardly extending leg portion 35 orthogonal to pan base 27 which terminates in an end wall portion 36 which is generally parallel to pan base 27. The transversely extending axial ends of roof pans 12 are for definitional purposes defined as a leading end 38 and a trailing end 39. It is to be understood that designations of right hand, left hand, leading, trailing, upwardly and downwardly are all relative terms and are simply used to define orientation of the components used in the system of the invention and are not used in the specifications or in the claims in the sense of what the terms mean in their absolute definitional sense. As thus defined, roofing pans 12 are similar in configuration but dimensionally different from that used in the FRS system.

Basically, the roof of building 10 is covered by positioning adjacent roof pans, 12a, 12b (FIG. 2) so that their longitudinally extending edges 23, 24 are aligned to extend along the pitch (shown by dash line indicated by reference numeral 41 in FIG. 3) of the building's roof. One of the pans 12a is then rotated so that its left hand edge 29 will slide underneath end wall 33 of adjacent pan 12b and the two pans 12a, 12b can be thus abutted so that the left hand upstanding wall 35 is adjacent right hand upstanding wall 31 and end wall 36 is underneath bight wall 32. A waterproof standing seam 40, as hereinafter described, is then formed between right hand and left hand ends, 25, 29 of adjacent roof pans 12a, 12b. In order to secure roof pans 12 to roof substrate 14 an attachment cleat 45 is provided.

Figure 3:
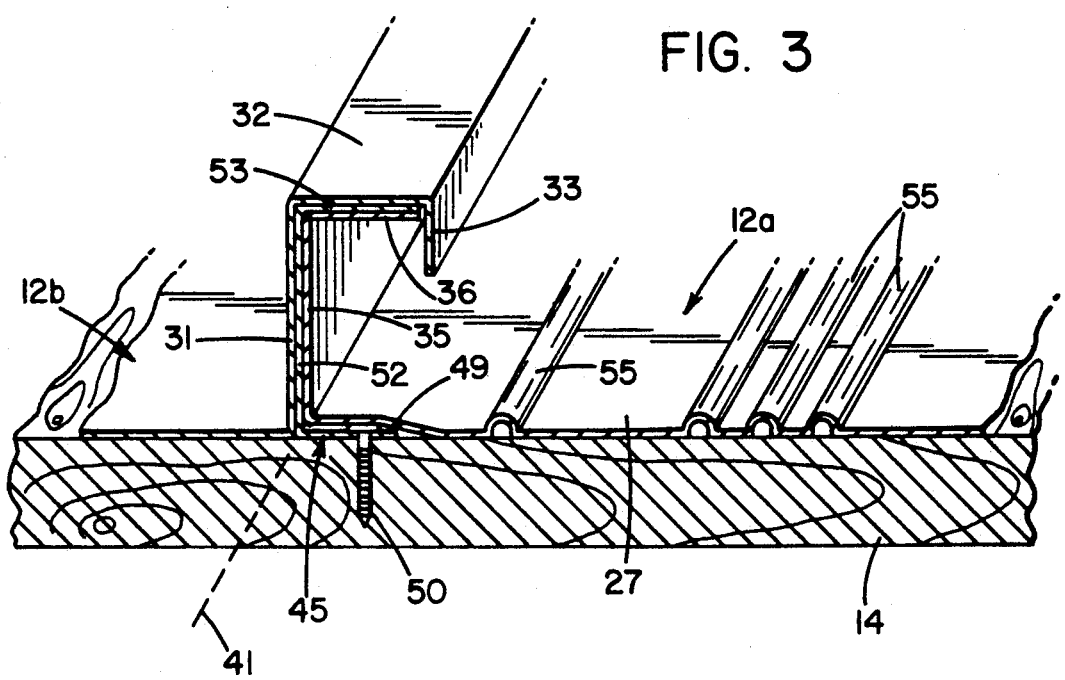
FIG. 3 is a perspective, partially cross-sectioned view showing the initial positioning on a roof substrate of two adjacent roofing pans held by an alternative embodiment of an anchoring cleat.
Figure 3A:
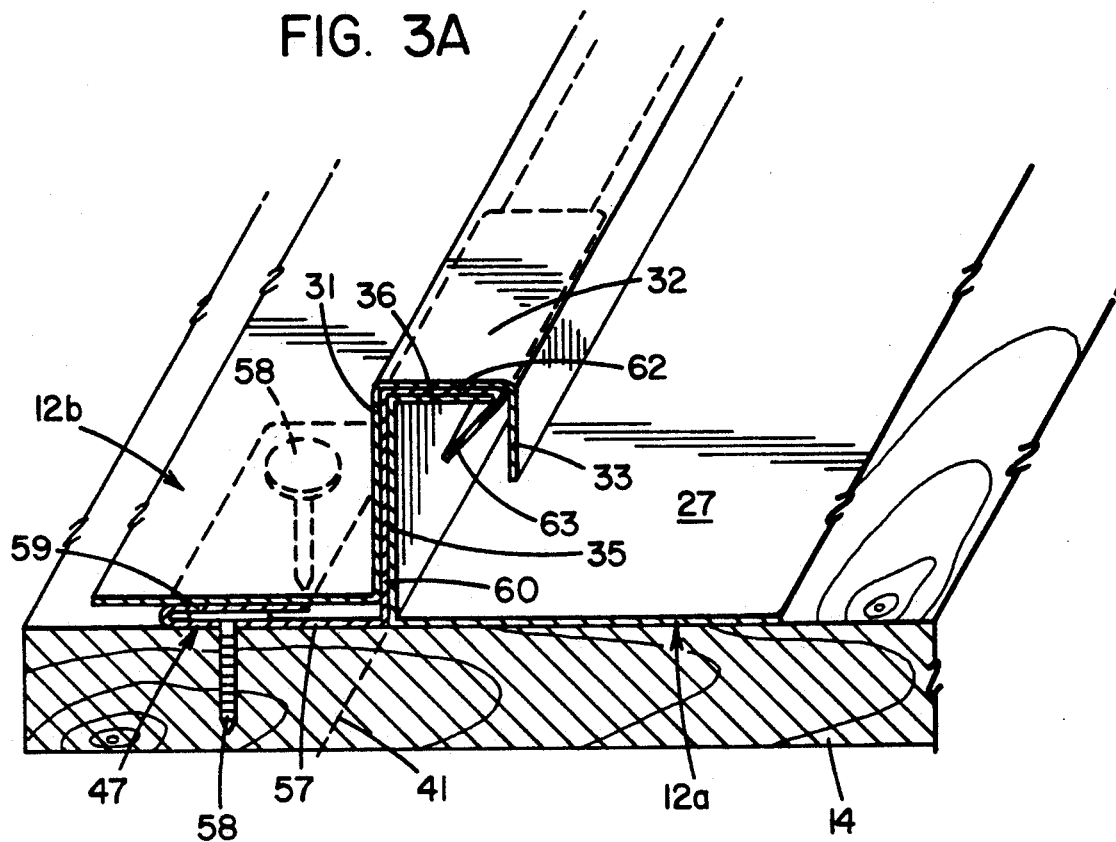
FIG. 3A is a perspective cross-sectioned view similar to FIG. 3 but illustrating a preferred embodiment of the anchoring cleat.
Figure 4A:
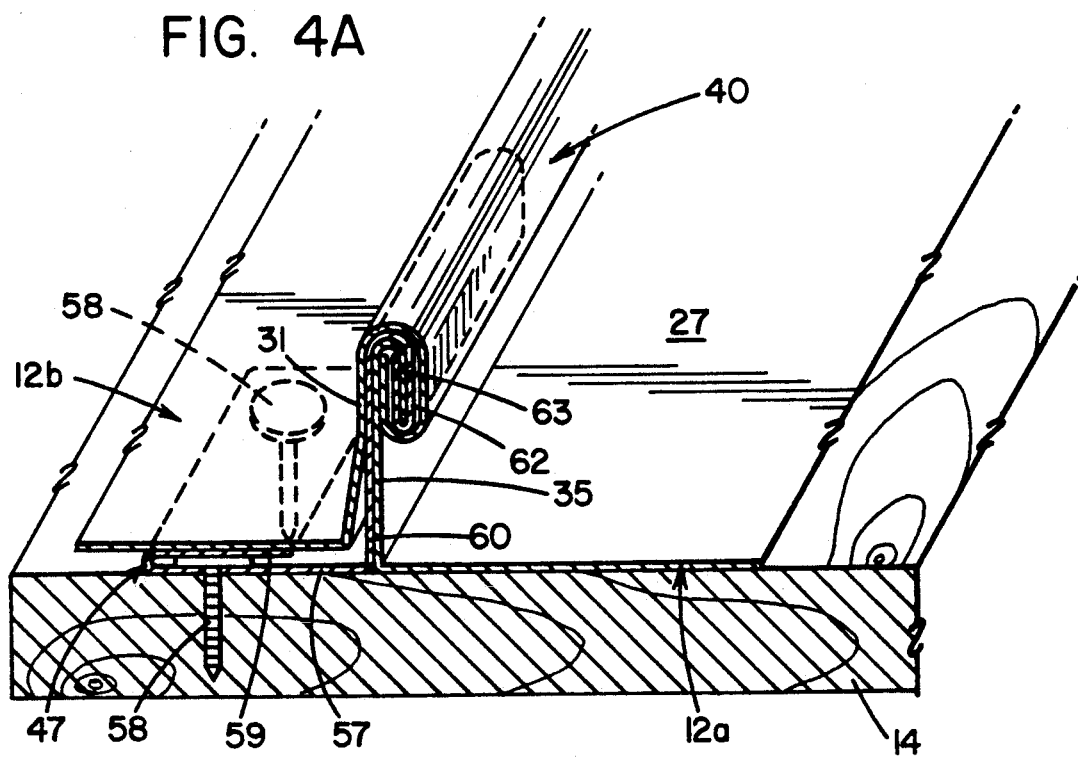
FIG. 4A is a perspective, partially cross-sectioned view similar to FIG. 4 but showing a preferred embodiment of the anchoring cleat.
Figure 4:
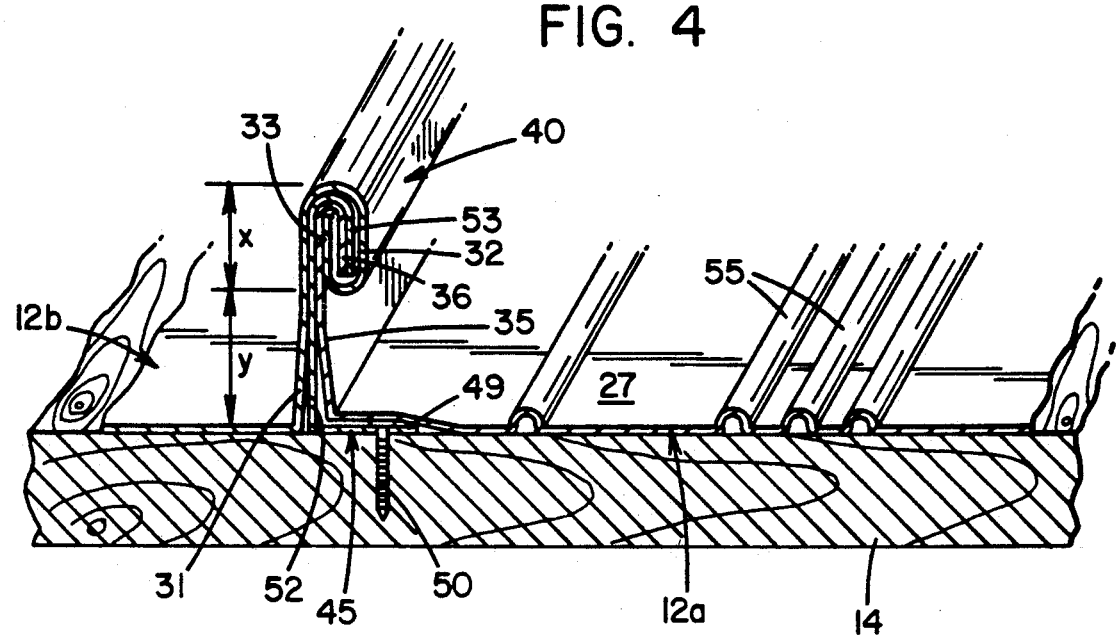
FIG. 4 is a perspective, partially cross-sectioned view of the roofing pans formed into a standing seam taken along line 4—4 of FIG. 1.

Referring now to FIGS. 3, 3A and 4, 4A, it should be noted that attachment cleat 45 shown in FIGS. 3 and 4 represent an alternative form of attachment cleat while attachment cleat 47 shown in FIGS. 3A and 4A represents the preferred embodiment of the attachment cleat used in the invention. Also, in accordance with conventional practice prior to installing the roof, an underlayment consisting of a layer of felt (15 lbs. minimum) covered with a slip sheet of rosin paper, not shown in the drawings, is positioned on top of roof substrate 14. Attachment cleat 45 which in the alternative embodiment shown in FIGS. 3 and 4 is shown as a continuous cleat has a flat base section 49 secured by fasteners 50 parallel to or co-axial with roof pitch line 41. Attachment cleat base section 49 terminates in a web section 52 which extends orthogonally to base section 49 and terminates in an end section 53 which is parallel to base section 49 to define a channel-shaped cross-section configuration attachment cleat. With attachment cleat 45 affixed to roof substrate 14 by fasteners 50 one of the roof pans, i.e. 12b, is brought into abutting relationship with attachment cleat 45 so that its right hand end 25 overlies attachment cleat 45. That is, upstanding leg portion 31 abuts web section 52 and bight wall portion 32 overlies end section 53. An adjacent pan 12a is then rotated into position as described above so that its left hand end 29 underlies attachment cleat 45. That is, upstanding leg portion 35 abuts web section 52 and end wall portion 36 underlies end section 53 to produce the relationship illustrated in FIG. 3 prior to forming standing seam 40. In the embodiment shown in FIGS. 3 and 4, base pan section 27 is shown formed with longitudinally extending strengthening grooves 55 formed therein although this is not necessary when roof pans 12 are formed of titanium sheet. Upstanding seam 40 is then formed as shown in FIG. 4 by first folding end wall portion 33 against the underside of end wall portion 36 and then bending the standing seam elements so that bight wall portion 32 and left hand end wall portion 36 and attachment cleat end section 53 is generally parallel to pan upstanding wall portions 31, 35 and attachment cleat web section 52. When standing seam 40 is formed pan base section 27 becomes stretched or tensioned with the result that left hand upstanding wall portion 35 is pulled away from cleat web section 52 and upstanding wall portion 31 is likewise pulled away from cleat web section 52 as best shown in FIG. 4. Typically, the total height of upstanding leg portions 31, 35 and web section 52 is about one inch and about one-third of this distance as indicated by dimension "x" in FIG. 4 is taken up by the formed standing seam 40 so that about two-thirds of the distance is taken up by standing leg portions 31, 35 which are stretched as a result of forming standing seam 40. Attachment cleats 45, 47 as are all other attachments described herein are formed from titanium sheets to avoid any galvanic action or chemical reaction which would occur if the cleats were made of a dissimilar material. In addition, attachment cleats 45, 47 are made from about the same gauge or thickness as that of roof pans 12.

Referring now to FIGS. 3A and 4A, the preferred form of attachment cleat 47 is shown. Attachment cleat 47 as contrasted to attachment cleat 45 has a discrete length of about two inches and a plurality of attachment cleats 47 are positioned at ten to twelve inch spacing along pitch line 41. Attachment cleat 47 has a flat base section 57 with openings for receiving a pair of fasteners 58, the heads of which are covered by a fold over flap portion 59 of base section 57. Attachment cleats 47 can be provided with fasteners 58 retained in place by fold over flap section 59 retaining fasteners 58 or flap section 59 can be folded over after attachment cleat 47 is affixed to substrate 14 on the job site. A web section 60 extends upwardly and orthogonally to base section 57 and terminates in an end section 62 which, like attachment cleat 45, is parallel to base section 57. However, end section 62 of attachment cleat 47 terminates in an end flap section 63 angularly extending vertically downwardly as best shown in FIG. 3A. End flap section 63 better assures positioning or a "snapping in" of left hand end 29 of roof pan 12 than does attachment cleat 45 and in addition better assists in forming standing seam 40. That is attachment cleat produces an eight wall thickness standing seam which enhances the water tightness of the standing seam joint when formed in a press fit manner. Attachment cleats 45, 47 are similar to attachment cleats used in the FRS system although dimensionally different.

Figure 5:
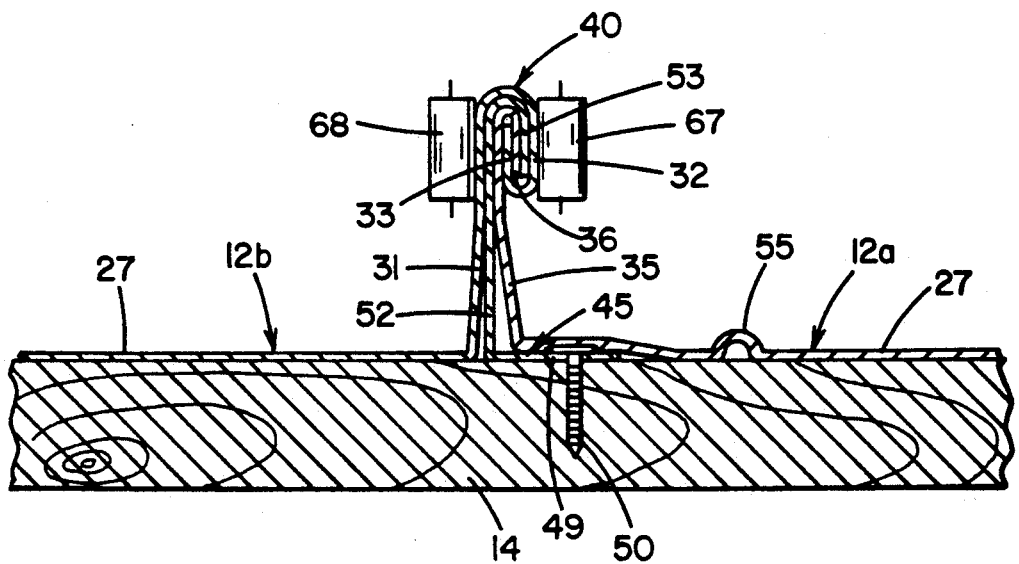
FIG. 5 is a cross-sectional view of the standing seam formed between two adjacent roof pans with a schematic illustration of the force applied to form the standing seam.

Referring now to FIG. 5, there is diagrammatically illustrated plunger ends 67, 68 of a hydraulic machine described and discussed in detail in Boyd U.S. Pat. No. 4,987,716 which is incorporated by reference herein so that the details of the various embodiments of that machine need not be described further in this specification. It is sufficient for an understanding of the present invention to note that standing seam 40 is formed by plungers 67, 68 exerting very high compressive force, in excess of two to three thousand psi so that a press fit is established between all of the wall sections of standing seam 40. In the present invention the press fit in and of itself provides the waterproof seam which retains its waterproof characteristics notwithstanding thermal expansion and contraction of roof pans 12. It should be noted that in the FRS system which utilized a press fit the terne coating on the stainless sheet functions in part as a solid sealant and to some extent the low melting point of the lead in the terne acts as an adhesive. Thus, the press fit in the FRS system distorted the terne coating which acted as a sealant and, even to some extent, a solder so that the standing seam was sealed. In the present invention, the physical and mechanical properties of the titanium sheet are different than the stainless steel sheet. The titanium sheet, although thinner than the stainless steel sheet used in the FRS system, requires a higher compressive force than the stainless steel sheet used in the FRS system to form the standing seam. However, because the titanium sheet is fully annealed, it can be formed into the standing seam, and when formed into a press fit standing seam, the press fit force coupled with the properties of the titanium sheet permits the seam to retain its water tight seam despite thermal contraction and expansion and cold climate application which produces ice. As is well known formation of ice in thawing and freezing temperatures will produce leaks in conventionally formed standing seams which heretofore required the seams to be soldered. The press fit standing seam of the present invention obviates the need for welding or soldering the seam either of which cannot be effected with titanium sheets for reasons discussed above. Nevertheless, in accordance with the broad concepts of the invention, a sealant such as butyl rubber caulk can be applied to one of the roof pans 25, 29 and a sealant which has adhesive characteristics such as one of the conventional vinyl caulks used for roof flashing can also be used. It is also possible to use conventional adhesive such as that used by airframe manufacturers to glue titanium sheets and physically bond the standing seam elements to one another.

Figure 6:
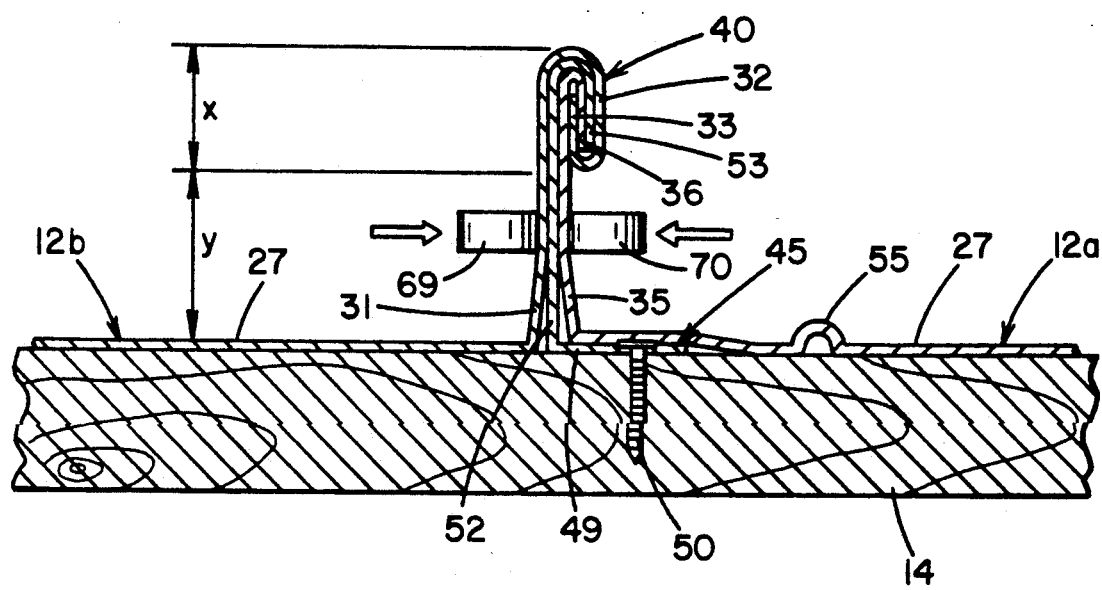
FIG. 6 is a cross-section view of the standing seam shown in FIG. 5 with an alternative method step diagrammatically illustrated.

FIG. 6 illustrates a further alternative embodiment to be used in conjunction with the press fit standing seam illustrated in FIG. 5. In FIG. 6, hydraulic plungers 69, 70 press fit upstanding leg portion 31 of right hand pan end 25 with upstanding leg portion 35 of left hand pan end 29 together with or without web section 52 of attachment cleat 45 sandwiched therebetween. This press fit occurs in the "y" distance and relieves tension exerted by pan base section 27 on standing seam 40. Preferably, one of the plungers 70 has a protrusion formed at its base (not shown) with a recess (not shown) formed in the opposite plunger 69 so that the leg portions 31, 35 are actually crimped into one another providing a second waterproof seam. The alternative embodiment thus shown in FIG. 6 contemplates the use of two press fit seams to obviate the need of any sealant or adhesive for the establishment of a waterproof joint between adjacent roof pans, 12a, 12b.

Figure 8:
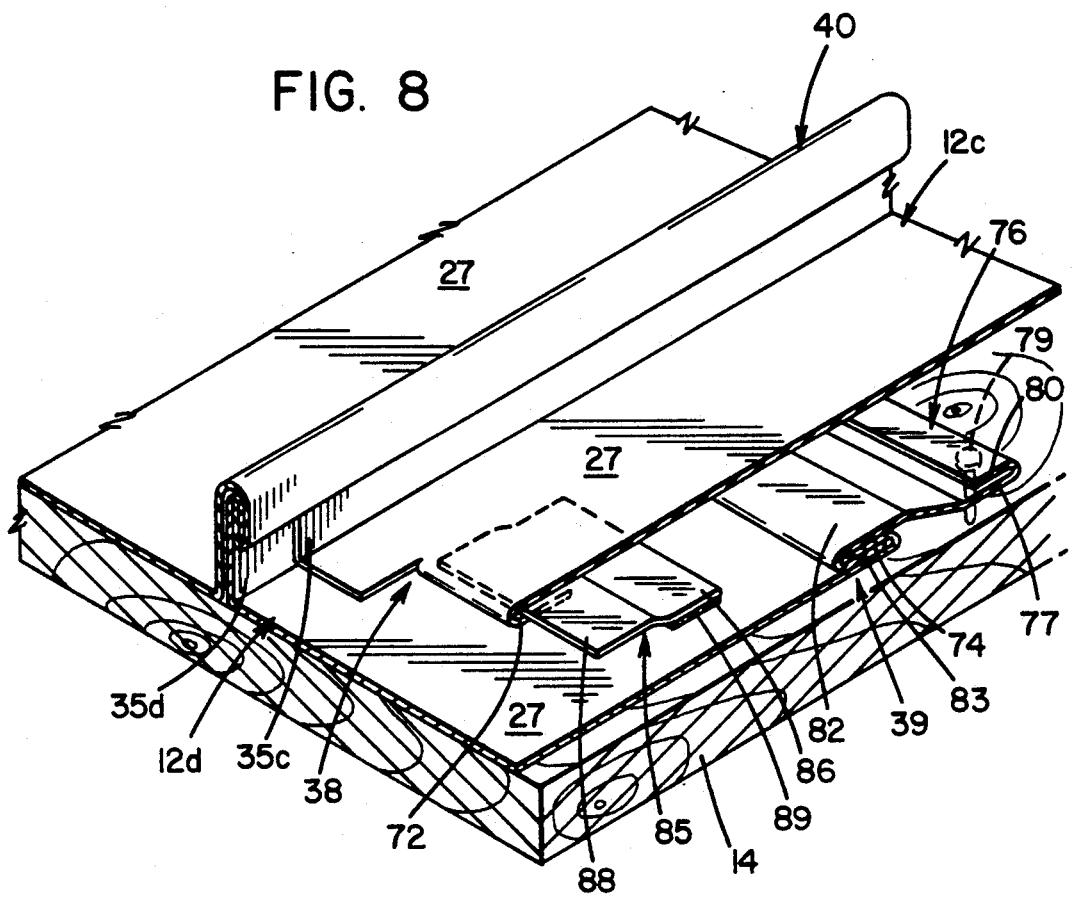
FIG. 8 is a sectioned perspective view illustrating a cross seam construction used in the present invention; and, FIG. 9 is a view taken along lines 9—9 of FIG. 1 illustrating the ridge cap construction used in the present invention.

Referring now to FIG. 8, there is illustrated the details of a cross seam arrangement to be used in the roofing system of the invention. As noted above, roof pans 12 are preferably limited in length to ten feet or less. Thermal expansion or contraction of roof pan 12 in a transverse direction is compensated by varying the attitude of right hand upstanding leg portion 31 and left hand upstanding leg portion 35 so long as the width of the sheet is maintained within the limit specified. Thermal expansion and contraction in a longitudinal direction, while maintaining the integrity of press fit standing seam 40, is compensated for by limiting the length of roof pans 12 to about ten feet, preferably eight feet, and utilizing the cross seam arrangement shown in FIG. 8. Roof pans 12 are axially connected with leading end 38 adjacent and overlying the trailing end 39 to permit the longitudinal expansion and contraction of standing seam 40 without adversely affecting its press fit, water sealing characteristics. Longer length pans undergo thermal expansion and contraction in the longitudinal and transverse direction which have, cumulatively, an adverse effect on standing seam 40.

Leading end 38 of roof pan 12 is formed with a fold under flap section 72 which, as its name indicates, is folded under pan base section 27 to form a C-shaped end. Fold under section 72 transversely extends over a portion of leading end 38 between or intermediate right hand and left hand pan ends 25, 29. Similarly, trailing end 39 has a fold over flap section 74 which is folded over on top of pan base section 27 and likewise transversely extends between or is intermediate right and left hand ends 25, 29. Roof pans 12 are positioned end-to-end so that leading end 38 of a higher pan 12c overlies trailing end 39 of the lower roof pan 12d, and multiple upstanding leg portions of right hand and left hand ends 25, 29 are abutting one another to form a "thick" standing seam at the axial ends of the pans. A titanium cross seam cleat 76 is used to secure trailing end 39 to roof substrate 14. Cross seam cleat 76 has a flat base section 77 with openings through which fasteners 79 can be applied to secure cross seam cleat 76 to substrate 14. As in attachment cleat 47, cross seam cleat has a fold over covering section 80 which sandwich the heads of fastener 79 therebetween. Extending from flat base section 77 of cross seam cleat 76 is an offset section 82 which in turn terminates in a fold under flap section .83 defining a U-shaped or C-shaped end opening. Pan fold over flap section 74 of trailing end 39 fits within fold under flap portion 83 of cross seam cleat 76 so that the C-shaped pan trailing end 39 is interlocked into the U-shaped flap section 83 of cross seam cleat 76. A fastening clip 85 is used to secure leading end 38 of higher roof pan 12c to trailing end 39 of the underlying roof pan 12d. Fastening clip 85 simply comprises a strip of titanium having a flat base end 86 and an attachment end 88 vertically offset from flat base end 86. Fastening clip 85 is bonded to pan base section 27 adjacent pan trailing end 39 at a fixed distance therefrom by means of an adhesive 89 conventionally used in manufacturing air frames formed of titanium sheet. With the lower roofing pan 12d secured to cross seam cleat 76 in the manner described, the overlying roof pan 12c is fitted into position by having its fold under flap 72 engage the underside of attachment end 88 of fastening clip 85. Over the distance that upper pan 12c overlies lower pan 12d, upwardly extending leg portions 31, 35 of upper pan 12c are outboard of but abutting upwardly extending leg portions 31, 35 of lower pan 12d.

Figure 7:
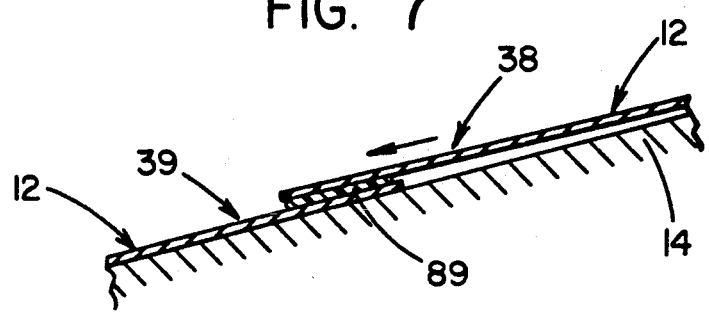
FIG. 7 is a cross-sectional view of titanium strips assembled to one another by a step used in an alternative embodiment of the invention.

Fastening clips 85 are adhesively secured to roof pan base section 27 in the field after the pans have been arranged in the position shown in FIG. 8, or alternatively, roof pans 12 can be provided with fastening clips 85 premounted. An alternative embodiment is generally illustrated in FIG. 7 and describes a construction in which leading end 38 of roof pan 12 is are not folded over but simply rests on top of trailing end 39 of adjacent roof pan 12 and is secured to trailing end 39 by means of adhesive 89. This is simply illustrated as an alternative form of construction. The cross seam construction illustrated in FIG. 8 is preferred because it permits relative movement of roofing pans. However, it should simply be noted that the detail shown in FIG. 7 may be utilized in the installation of titanium flashing if required for the roof system.

Figure 9:
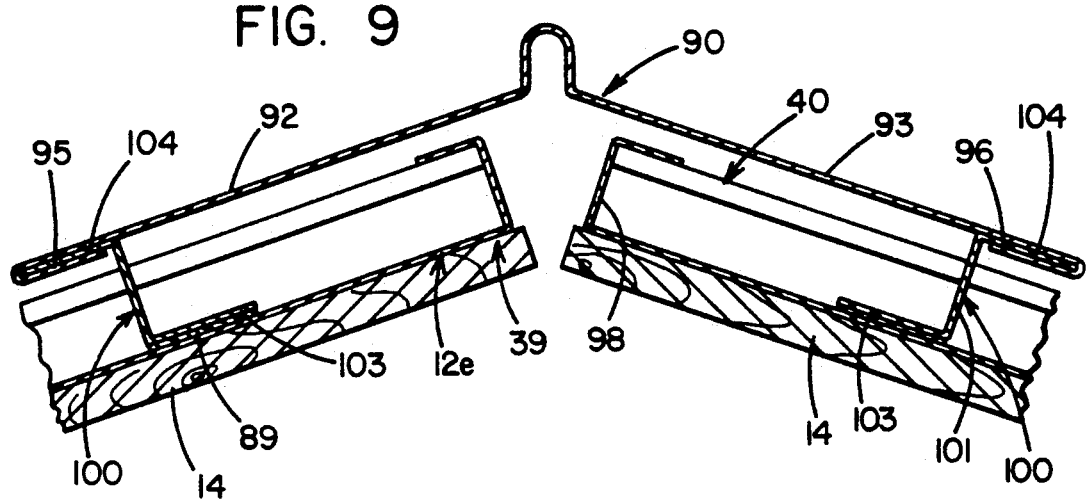

Referring now to FIG. 9, there is shown a construction detail for installation of a roof cap 90 installed, for example, at the apex of the building roof shown in FIG. 1. Roof cap 90 is formed of titanium sheet and is in the form of a V-shape with legs 92, 93 of the "V" terminating at ends 95, 96 respectively. In its preformed "as supplied" shape, ends 95, 96 of roof cap 90 form an acute angle with legs 92, 93 and ends 95, 96 are folded over at the job site into the assembled position shown in FIG. 9. The trailing ends 39 of the highest most roofing pans 12e are formed into an L-shaped cross-section configuration 98 as shown in FIG. 9 and this box end construction 98 extends between right and left hand pan ends 25, 29 to prevent water from entering building 10 through the roof apex. A b-atten clip 100 is provided for attaching roof cap 90 to b-atten pans 12e. Roof clip 100 has a somewhat S-shaped cross-section configuration extending between right and left hand ends 25, 29 of each roof pan 12e. B-atten clip 100 includes a central web section 101 vertically extending higher than standing seam 40. Extending from the bottom of web section 101 adjacent box end 98 is a flat base section 103 secured by adhesive 89 to pan base section 27. Extending from the top of web section 101 away from box end 98 and parallel to flat base section 103 is attachment section 104. Roof cap ends 95, 96 are folded under attachment section 104 to secure roof cap 90 to adjacent pans 12e at the roof apex, thus preventing water from entering the building through the roof apex.

The invention has been described with reference to preferred and alternative embodiments. Modifications and alterations will become apparent to those skilled in the art upon a reading and understanding of the detailed discussion of the invention provided for herein. It is intended to include all such modifications and alterations insofar as they come within the scope of the present invention.

Having thus defined the invention, the following is claimed:

1. A method of applying a water gathering and channeling roof covering onto the upper roof of a building suitable for collecting potable water, which roof is at least slightly pitched, said method comprising:
   (a) providing a fully annealed sheet of at least 99% titanium with a thickness of less than 0.020 inches;
   (b) cutting said sheet into a flat strip having a length of no more than about 10 feet and a width of less than about 3 feet extending between first and second parallel edges of said elongated strip;
   (c) forming said first edge of said strip into a first standing seam element with a first integral wall extending orthogonally from said strip and coterminous with said first edge, said first standing seam element terminating in an outwardly extending flange;
   (d) forming said second edge of said strip into a second standing seam element with a second integral wall extending orthogonally from said strip and coterminous with said second edge, said second standing seam element terminating in an inwardly extending flange;
   (e) placing two of said formed titanium strips in side-by-side relationship on said roof with each of said strips forming water drain troughs in the direction of the pitch of said roof and with the first standing seam element of the first of said two strips abutting the second standing seam element of the second of said two strips;
   (f) folding said abutting seam elements into an outwardly protruding standing seam between said two strips with said integral walls of said abutting seam elements remaining generally orthogonal to said first and second titanium strips;
   (g) providing an elongated standing seam attachment cleat formed from a sheet of at least 99% titanium and having a lower generally flat plate member and an orthogonal wall member; and
   (h) fastening said flat plate member of said cleat to said roof substrate with said cleat wall member extending upwardly between said abutting standing seam elements whereby said cleat is folded with said abutting standing seam elements into said standing seam.

2. The method of claim 1, further including the steps of providing a fully annealed sheet of at least 99% titanium having a thickness less than 0.020 inches; forming said sheet into a gutter and a downspout connected thereto for collecting potable water from said downspout in a storage container.

3. The method of claim 1, further including press fitting said integral walls of said abutting seam elements together at a position below said standing seam whereby an additional seam is formed.

4. The method of claim 1, further including press fitting said integral walls of said abutting seam elements together at a position below said standing seam whereby an additional seam is formed.

5. The method of claim 4, wherein a sealant is applied to at least one of said standing seam elements prior to forming said standing seam.

6. The method of claim 5, wherein said sealant also functions as an adhesive.

7. The method of claim 1, wherein a sealant is applied to at least one of said standing seam elements prior to forming said standing seam.

8. The method of claim 7, wherein said sealant also functions as an adhesive.

9. The method of claim 1, wherein said sealant is applied to at least one of said standing seam elements prior to forming said standing seam, said standing seam is formed by pressing said seam elements together with a force sufficient to form said standing seam as a press fit seam.

10. The method of claim 9, wherein said sealant also functions as an adhesive.

11. The method of claim 1, wherein said strip is between 0.010–0.015 inches in thickness.

12. The method of claim 11, wherein said strip is between 0.012–0.014 inches in thickness.

13. The method of claim 1, wherein said strip and cleat are between 0.010–0.015 inches in thickness.

14. The method of claim 13, wherein said strip and cleat are between 0.012–0.014 inches in thickness.

15. The method of claim 1, wherein a first plurality of said titanium strips are placed side-by-side with standing seams formed therebetween to cover a first portion of the substrate of said roof; a second plurality of said titanium strips are placed side-by-side with standing seams formed therebetween to cover a second portion of said roof substrate; said first and second portions situated relative to one another so that the axial ends of said first plurality of titanium strips are adjacent but spaced from the axial ends of said second plurality of titanium strips;

providing for each titanium strip a titanium batten clip of somewhat S-shaped configuration, said batten clip having a web section generally orthogonal to said standing seam and transversely extending between adjacent standing seams, an attachment leg extending from said web section away from said strip's adjacent axial end and a base section extending from said web section towards said strip's adjacent axial ends;

affixing by adhesive said clip's base section to each strip at a predetermined distance from said strip's adjacent axial end;

providing a titanium ridge cap of generally V-shaped configuration having ends formed at an acute angle with each leg of said V; and bending said ends of said ridge cap under said clip's attachment leg to affix said ridge cap to said strip by means of said batten clips whereby each of said strip's adjacent axial ends are covered.

16. The method of claim 15, further including the steps of forming said strips with a trailing end and a leading end, the edge of said trailing end extending between said standing seam elements folded back on top of said strip and the edge of said leading end extending between said standing elements folded back under said strip;

providing a titanium cross seam cleat having a C-shaped open end and securing said cross seam cleat to the roof substrate;

securing said trailing end of a strip to said C-shaped open end of said fastener clip;

providing a titanium fastening clip having an offset edge and affixing said fastening clip by adhesive to said strip at a predetermined distance from said trailing end of said strip and intermediate said standing seam elements;

affixing said leading edge of a longitudinally adjacent higher strip to said offset clip; and forming said standing seam continuously between adjacent strips whereby a water tight cross seam is formed between adjacent strips which permits thermal expansion and contraction of said strips.

17. The method of claim 1, further including the steps of forming said strips with a trailing end and a leading end, the edge of said trailing end extending between said standing seam elements folded back on top of said strip and the edge of said leading end extending between said standing elements folded back under said strip;

providing a titanium cross seam cleat having a C-shaped open end and securing said cross seam cleat to the roof substrate;

securing said trailing end of a strip to said C-shaped open end of said fastener clip;

providing a titanium fastening clip having an offset edge and affixing said fastening clip by adhesive to said strip at a predetermined distance from said trailing end of said strip and intermediate said standing seam elements;

affixing said leading edge of a longitudinally adjacent higher strip to said offset clip; and forming said standing seam continuously between adjacent strips whereby a water tight cross seam is formed between adjacent strips which permits thermal expansion and contraction of said strips.

18. The method of claim 17, including pressing said seam elements together with a force sufficient to form said standing seam as a press fit seam.

19. The method of claim 18, wherein said strip, said cleats and said clips are between 0.010–0.15 inches in thickness.

20. The method of claim 19, wherein said strip, said clip and said cleats are between 0.012–0.014 inches in thickness.

* * * * *